United States Patent

Köppl

[11] 4,213,830
[45] Jul. 22, 1980

[54] METHOD FOR THE TRANSFER OF HEAT

[76] Inventor: Franz Koppl, Im Schönblick 41, Tübingen, Fed. Rep. of Germany

[21] Appl. No.: 835,584

[22] Filed: Sep. 22, 1977

[30] Foreign Application Priority Data

Sep. 23, 1976 [DE] Fed. Rep. of Germany ....... 2642836

[51] Int. Cl.² ............................................... C02B 1/04
[52] U.S. Cl. .......................................... 203/11; 203/1; 203/25; 203/27; 203/40; 203/DIG. 8; 203/DIG. 16; 159/17 R; 202/174
[58] Field of Search ....................... 203/10, 11, 27, 40, 203/DIG. 8, DIG. 20, DIG. 17, 1-3, DIG. 16, 71, 73; 202/174, 206, 235, 160, 177, 176, 197; 159/17R

[56] References Cited

U.S. PATENT DOCUMENTS

| | | | |
|---|---|---|---|
| 2,510,548 | 6/1950 | Brunjes | 203/27 |
| 3,203,875 | 8/1965 | Sturterant | 203/21 |
| 3,243,359 | 3/1966 | Schmidt | 203/DIG. 8 |
| 3,244,530 | 4/1966 | Byer et al. | 203/27 |
| 3,411,866 | 11/1968 | Jewell | 202/206 |
| 3,803,002 | 4/1974 | Skraba et al. | 202/206 |
| 3,890,207 | 6/1975 | Chapman et al. | 203/DIG. 8 |

FOREIGN PATENT DOCUMENTS 2360491 10/1974 Fed. Rep. of Germany.

*Primary Examiner*—Wilbur L. Bascomb, Jr.

*Attorney, Agent, or Firm*—Dressler, Goldsmith, Shore, Sutker & Milnamow, Ltd.

[57] ABSTRACT

A method is provided for the transfer of heat from a source of thermal energy to at least one thermal user or heat consuming apparatus wherein waste water, such as from an industrial process, is used as the heat transfer medium and wherein a portion of the waste water flow is evaporated in an indirect heat exchanger under pressure to yield a mixture of steam and heated liquid waste water. The steam is supplied to an indirect heat exchanger for supplying heat to the heat consuming apparatus and the heated waste water is subsequently vaporized in a plurality of stages by reducing the pressure on the waste water in each stage and by using the steam formed by the vaporization in each stage to supply part of the heat of vaporization for the waste water in the subsequent stage. When the heat requirement of the heat consuming apparatus is reduced, the heat exchanger supplying heat to the heat consuming apparatus may be valved out of the system or the steam flow thereto may be reduced. With an increased waste water yield from the particular process, a portion of the pressurized steam formed therefrom in the high pressure evaporator which flows to the heat exchanger for the heat consuming apparatus may be diverted to another part of the system.

14 Claims, 1 Drawing Figure

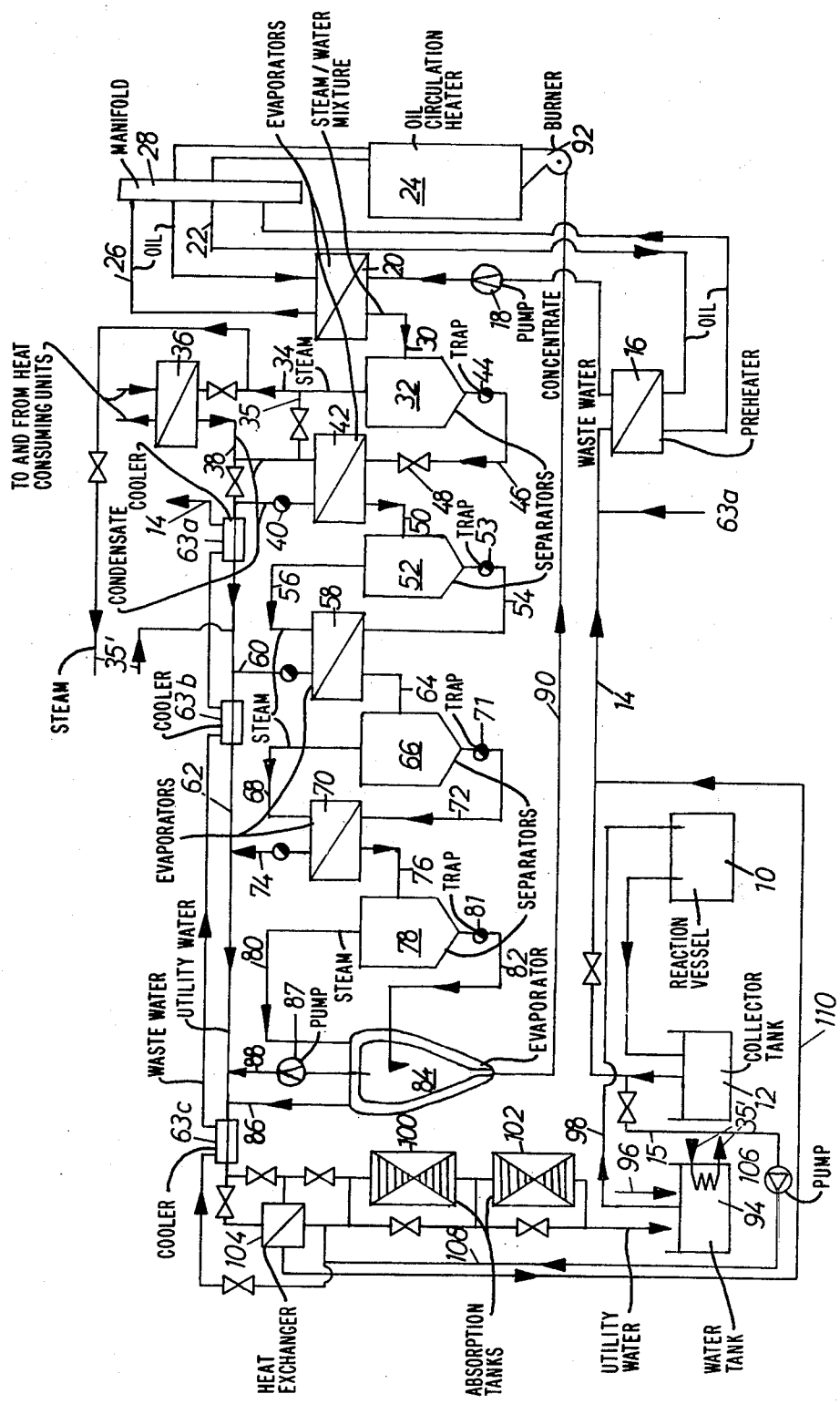

METHOD FOR THE TRANSFER OF HEAT

BACKGROUND OF THE INVENTION

The invention relates to a method for the transfer of heat from a heat generator to at least one heat consuming apparatus operated at temperatures above 100° C. (212° F.) using waste water as heat transfer agent.

The waste water in this case is, in particular, industrial waste water such as, for example, water from processes of the textile industry which contains dissolved or dispersed organic and/or inorganic substances. Some of these substances have a tendency to form incrustations on the walls of evaporation installations and can cause a decrease in the heat transfer capability and possible plugging of pipe and other conduits. Moreover, certain substances will cause corrosion of the evaporation installation at elevated temperatures. These difficulties become noticeable especially in the final evaporation phases where the concentration of these materials, and possibly also the temperatures and pressures, are elevated.

Corrosive waste waters which contain dissolved acids and/or hydrolyzing salts are found in many industries, including for example, the textile industry, metal-pickling shops, electroplating shops, etc. In particular, waste waters from the textile industry are among those industrial waste waters which contain incrustation-forming substances. For example, they may contain fiber degradation products, dyes, carbohydrates, fats, soaps and textile sizings. Other waste waters of the crust-forming type are encountered in food processing plants where waste waters containing protein or albumen are a particular problem.

According to prior art, the waste waters of the last named type have been purified heretofore in most cases by precipitation of the organic substances chemically, for example by means of polyvalent salts. However, with this type of purification, new foreign substances can be introduced. Moreover, the purification of these waste waters is possible by catalytic oxidation, ion exchange and reverse osmosis. Finally, such waste waters also can be purified biologically.

However, none of these methods satisfy the industrial requirements because in most cases the purified water can no longer be employed as consumable water, so that it must be dumped into the waterways and/or into the ground water, and this leads to ecological pollution. Additional problems are encountered in case of warm or hot waste waters, because they can be conducted into the sewage system only subsequent to a costly cooling.

The method with the best separation effect for foreign substances dissolved in water, namely the evaporation, has, up until now, received relatively little consideration because of the high energy requirements for such evaporation purification of the waste water, where water vapor would be produced at atmospheric pressure and at about 100° C. and would be unusable in most cases. The energy costs would be far too high to encourage development of this method.

That is why we have already seen the development of the multistage vacuum vapor system which has been so designed that, at generally reduced energy level required for the evaporation process, a decrease in the thermal energy contained in the vapor of the final evaporation phase (by means of cooling water or in cooling towers) was still tolerable.

An evaporation method for the purification of highly contaminated industrial waste waters disclosed in the German Pat. No. 2,360,491 uses a fundamentally different procedure. According to that method the industrial waste waters are likewise used to transfer the heat from a heat source to at least one heat consuming apparatus operated at temperatures exceeding 100° C. (212° F.), wherein the waste water is evaporated under indirect heat exchange with the heat source under pressure in part, wherein the pressurized vapor or steam is brought into indirect heat exchange contact with the heat consuming devices, and wherein the non-volatile impurities contained in the waste water are separated with the non-evaporated portion of the waste water (waste water concentrate), and a condensate suitable for use as consumable water is obtained from the waste water steam.

With this procedure, relatively little energy is irreversibly dissipated. The high degree of purification which is accomplished with the evaporation of waste water is relatively economical and can increase the degree of profitability of a particular process. Furthermore, the purified waste water can be reused in the plant as usable water. Moreover, the incrustations of the evaporator walls, a problem under evaporation at high pressure, is, surprisingly, largely avoided.

SUMMARY OF THE INVENTION

The objective of the present invention relates to a further improvement of this method, particularly an improved adjustment to the fluctuating thermal requirements of the heat-consuming devices. It frequently happens that, at constant waste water production, the energy requirement of the heat consuming devices decreases. This is the case, for example, when a heating operation has been completed or when the heat consuming device must be cooled. On the other hand, at constant heat consumption, waste water yield may increase. Because the waste water must be evaporated as completely as possible, the quantity of heat introduced into the system is determined primarily by the quantity of waste water, by the inlet temperature of the waste water to be evaporated, and also by the discharge temperature of the generated steam.

This high pressure steam with a high thermal enthalpy for the heat consuming devices in the plant should be generated economically. On the other hand, usuable water, the temperature of which is around the boiling point of water (212° F.), should be obtained.

Consequently, the invention relates to a method for the transfer of heat from a heat generator to at least one heat consuming unit operated at temperatures above 100° C. using waste water as the heat transfer medium or agent wherein the waste water is partly evaporated under pressure through indirect heat exchange with the heat source wherein the evaporated steam is brought into indirect heat exchange with the heat-consuming units, wherein the non-volatile impurities contained in the waste water are separated with the non-evaporated part of the waste water (waste water concentrate), and wherein a condensate usuable as consumable water is obtained from the waste water steam. This method is characterized by the fact that, at reduced heat requirements of the heat consuming unit or, at increased waste water production, part of the pressurized steam can be directed to another part of the system.

The waste water is partly evaporated in the high pressure part of a combined high and low pressure device and the waste water concentrate from the high pressure part is further evaporated in a low pressure part of the installation, whereby the residual heat of the high pressure steam used for the heat consuming units in the plant is used to heat the low pressure part, in order to achieve an increased evaporation of the waste water concentrate.

According to one preferred embodiment of the method, a portion of the pressurized steam, along with the condensate, if any, obtained during the indirect heat exchange with the heat consuming units, is used as heat carrier for the subsequent evaporation of the unevaporated quantity of the waste water under a lower pressure (the first low pressure stage or phase of the system).

In other words, only part of the waste water is evaporated or vaporized into high pressure steam in the high pressure section and the resulting high pressure steam is preferably used for the indirect heating of heat consuming units in the plant which require thermal energy with high enthalpy, for example, drying facilities. The remaining, unevaporated water that is heated (but not vaporized) in the high pressure part, the so-called waste water concentrate, which accounts for the principal quantity, is depressurized whereby a sufficiently high quantity of lower pressure steam is formed which, together with (1) any portion of the pressurized steam by-passing the heat consuming units and (2) the condensate being returned from the heat consuming units in the plant (and containing still residual heat), is used in the low pressure part of the installation to evaporate or vaporize the waste water concentrate at lower temperatures. This evaporation of the remaining portion of the waste water concentrate is practically complete.

Generally, the pressure in the high pressure part is maintained sufficiently high enough that the energy of the quantity of pressurized steam branched out of the high pressure phase in connection with the energy generated during the subsequent evaporation furnishes a portion, for example 60 to 90 percent, of the energy required for the evaporation in the low pressure part. The remaining energy requirement is furnished by the residual heat of the high pressure steam generated in the high pressure portion, whereby this high pressure steam is obtained in the form of a condensate following passage through the heat consuming units of the plate. A plurality of stages may be used in the low pressure section.

The relation between the quantities of heat transmitted by the pressurized steam and by the condensate may vary within wide ranges; preferably, this ratio is between about 1:10 and about 10:1.

Generally, the waste water in the high pressure portion is heated at a pressure of about 10 to 40 atmospheres, preferably of about 15 to 25 atmospheres gauge.

The term "low pressure portion" shall mean that part of the facility which is operated at atmospheric pressure or slightly elevated pressure, but preferably at subatmospheric pressure. In the latter case, hot usuable water is obtained having a boiling point below the boiling point at atmospheric pressure.

Preferably, the evaporation in the high pressure part takes place in one stage, and in the low pressure part in a plurality of stages.

In this respect, the steam obtained during the subsequent evaporation at a lower pressure (first low pressure stage) may be used for additional post evaporation of the unevaporated part of the waste waters in a subsequent low pressure stage, and if necessary, this step may be repeated.

Because the quantity of steam available in the first phase of the low pressure part is very high, a high evaporation efficiency can be achieved in the subsequent stages, which preferably are operated at decreasing pressures, particularly below atmospheric pressure. The low temperature evaporation of the waste water drain flows, which become more and more concentrated further prevents the danger of corrosion damage and of incrustation since both phenomena are favored by elevated temperatures and concentrations.

The prerequisite for achieving high evaporation efficiencies in the low pressure part is that, at a high flow rate or throughout quantity, only a relatively small portion of the waste water (for example about 1/6 to ⅓) is evaporated in the high pressure part. The concentration of harmful substances in the waste water at the discharge of the high pressure part is thus still relatively low but in spite of the high prevailing temperatures, no problems of corrosion and/or incrustation occur. If the evaporation takes place predominantly in the low pressure part, the additional advantage is obtained, even if a plurality of stages are used in the high pressure part, that at a given counter-pressure of the heat consuming units in the first stage (viewed from the point of the introduction of the heating medium) the pressure to be applied need not be so high. That is, the first stage of the high pressure part may be operated at a lower pressure. Due to the associated lower temperatures, any corrosion and incrustation problems are inhibited. Under multistage operation, the high pressure part preferably is operated in parallel flow, whereby it is possible to get along with few stages. As a result it also is possible to generate a high temperature gradient at the exchange surfaces, so that smaller heat exchangers can be used.

Valuable usable steam is obtained at the discharge of the high pressure section (viewed from the energy carrier) for the heat consuming units in the plant, from which, at reduced thermal requirements of the heat consuming units or in case of increased waste water production, a portion of the flow is diverted and used in another section of the plant.

According to one particularly preferred embodiment, the low pressure section and/or the last stage of the low pressure section is operated at temperatures of less than about 100° C., whereby the condensate thereby obtained need not be cooled further, but is suitable for immediate use as consumable water.

The diverted portion of the pressurized steam from the high pressure section may be used in various ways in different parts of the plant. For example, the diverted portion may, together with the condensate obtained during the indirect heat exchange with the heat consuming units, if any, be used to heat the usable water condensate and/or the waste water. In certain cases, particularly when the last stage of the low pressure section is operated at subatmospheric pressure, the usable water condensate may have too low a temperature for many an application. By treatment with the diverted portion of the pressurized steam, it is possible to elevate the temperature to the desired value. Thereby, it is possible to either directly introduce the pressurized diverted steam into the consumable water or into an indirect heat exchange.

In some cases, the consumable water condensate (also called distillate) contains volatile components which may possibly be harmful when the consumable water is used again. In this case, according to a preferred embodiment of the method, the volatile components contained in the usable water condensate are removed with the aid of an absorption agent. Because the effectiveness of the absorption agent, as a rule, is better at lower temperatures, the consumable water condensate preferably is cooled, according to a preferred embodiment of the method according to the invention, prior to contact with the absorption agent by indirect heat exchange with the waste water.

For example, the consumable water condensate also can be cooled by conducting the waste water sequentially in counter-current flow through the coolers arranged after each evaporator stage.

In carrying out the method according to the invention it also proved to be favorable to separate the steam in cyclone separators from the waste waters and/or the waste water concentrates.

Numerous other advantages and features of the present invention will become readily apparent from the following detailed description of the invention and of one embodiment thereof, from the claims and from the accompanying drawings.

BRIEF DESCRIPTION OF THE DRAWING

The invention is generally illustrated in a nonrestrictive manner in the attached schematic drawing.

DESCRIPTION OF THE PREFERRED EMBODIMENT

This invention may be used in many different forms. This specification and the accompanying drawing disclose only one specific embodiment of the invention. The invention is not intended to be limited to the embodiment illustrated, and the scope of the invention will be pointed out in the appended claims.

The waste water collected in a reaction vessel 10 (for example a dye vat or a metal pickling bath) first is guided to a collector tank 12, from where a portion can be conveyed via a conduit 14 through a preheating unit 16, if it has a low input temperature and/or if a heat carrier is anyway available for this purpose. Another portion of the waste water may be discharged via conduit 15 to the condensate cooling, as will be explained further below. In the following considerations we presume the quantity of waste water to be approximately 50 m³/hour, although this quantity may of course be varied depending on the installation. After having passed through the preheating unit 16, the waste water is conveyed with the aid of a high pressure pump 18 into the evaporator 20, where it is heated to a temperature of about 210° to 250° C. This heating is carried out appropriately with the aid of a fluid heat carrier which is fed in via conduit 22. Generally, a heat carrier oil is used for this which is heated with the aid of the oil circulation heater 24.

The oil returning from the evaporator 20 via conduit 26 may be guided into a manifold 28 from where a partial stream is guided into the preheating apparatus 16 and from it back into the oil circulation heater 24, if so desirable.

The waste water is heated in the evaporator 20 to about 210° to 220° C. so that about 1/5 evaporates to steam at a pressure of about 18 atmospheres gauge (corresponding to 210° C.). The 4/5 of the liquid waste water and 1/5 steam flow via conduit 30 to the high pressure separator 32, where the steam and waste water are separated from each other. A portion of the high pressure steam (about 10 tons/hour) flows via conduit 34 to heat exchanger 36, where it transfers a major portion of its heat to the heat consuming devices of the plant (not shown, but for example, drying apparatus). When the heat requirements of the heat consuming devices in the plant are too low, or when the waste water production is too high, part of the steam is directed immediately into the evaporator 42. Additional steam may be conveyed via conduit loop 35' through a heat exchanger arranged in the regeneration water tank 94 (shown as a heating coil). Thus, the installation can be advantageously adjusted to meet the requirements of the most diverse operating conditions.

The condensate formed in the heat exchanger 36 flows through conduit 38 to the evaporator 42, where it transfers an additional amount of heat to the waste water. About 2 tons of water per hour can be evaporated by the condensate heat. Additional waste water is evaporated by the steam supplied via conduit 35. A condensate separator or steam trap 40 is provided at the outlet of the evaporator 42.

The waste water (4/5 of the original quantity) discharging from the high pressure separator 32 through the condensate separator 44 and the conduit 46 is depressurized as it passes through a pressure reducing device 48 to atmospheric pressure. Thus, the high pressure section is limited on the one side by the pump 18 and on the other side by the condensate steam trap 40 and the pressure reduction device 48.

At the discharge from the relaxation device 48, some of the waste water will flash or evaporate into steam, the amount of steam forming being increased further by heating with the condensate from the evaporator and/or the high pressure steam from conduit 35. Thus, a mixture of waste water-flashed steam and liquid waste water enters the separator 52 via conduit 50. The separator 52 and the evaporator 42 comprise the first stage of the low pressure section of the system.

The flow of steam in the mixture in conduit 50 is at least 10 tons/hour, of which 8 tons/hour originate from the vaporized or flashed waste water, and 2 tons/hour are generated by transfer of the heat of the condensate from conduit 38 in the evaporator 42 to the entering liquid waste water. The amount of steam in conduit 50 increases if excess steam is introduced via conduit 35. The amount of the waste water concentrate leaving the separator 52 via the condensate steam trap 53 in conduit 54 amounts to approximately 30 tons/hour. Preferably, separator 52 is maintained at atmospheric pressure and the temperature of the waste water in the separator 52 is about 100° C.

The low pressure steam of 1 atmosphere (totaling 10 tons/hour) discharging from the separator 52 via conduit 56 enters the evaporator 58, where it transfers its heat to the waste water entering via conduit 54, condenses, and flows as condensate via conduit 60 to collecting conduit 62 where it is combined with the condensate originating from the evaporator 42.

The condensate in the collector conduit 62 can be directed through the coolers 63a, 63b, and 63c, through which the waste water counter-currently flows from tank 12 via conduit 108. The waste water heated thereby is returned again into conduit 14.

The pressure of the waste water concentrate flowing through conduit 64 (approximately 20 cubic meters per hour) is reduced, prior to the water entering the second separator 66 (of the low pressure part of the system), to 0.8 atmospheres, which corresponds to a saturation temperature of about 90° C. (194° F.).

In the separator 66 steam is generated at an approximate rate of 10 tons per hour. This steam is conducted via conduit 68 into the evaporator 70, where it transfers its heat to the waste water concentrate conducted through the condensate steam trap 71 and conduit 72 into the evaporator 70 and leaves the evaporator 70 as condensate through conduit 74.

The pressure of the heated waste water concentrate leaving the evaporator 70 is reduced in conduit 76 in the third separator 78 of the low pressure part of the system. Thereby, about 10 tons/hour of steam at 0.6 atmospheres (corresponding to about 80° C. [176° F.]) are formed, this steam leaving the separator 78 through conduit 80.

The waste water concentrate (approximately 10 m³/h) from separator 78 is conducted through the steam trap or condensate separator 81 in conduit 82 to a flash evaporator 84, wherein it is heated by indirect heat exchange with steam from conduit 80, that steam being conducted through a double jacket in the evaporator 84. The condensate from this steam enters the collector pipe 62 via conduit 86. The flash evaporator 82 is maintained at a pressure of about 0.2 atmospheres, corresponding to a saturation temperature of approximately 60° C. (140° F.), so that a further quantity of steam, about 9.8 tons/hour, is produce which, after passing through a pump 87, is supplied through conduit 88, as condensate into the collecting conduit 62.

The waste water concentrate (approximately 200 liters/hour) flows from the flash evaporator 84 through a conduit 90 to the burner 92 of the oil circulation heater 24. Here the organic components of the waste water can be burned, leaving only the solid, non-decomposable salts of the waste water which, if desired, may be reused.

The condensate from the collector conduit 62 may be passed immediately into the regeneration water tank 94, where it may, if desired, be diluted with fresh water from conduit 96 and returned via conduit 98 into the reaction vessel, 10.

If the condensate from conduit 62 contains organic substances which were carried along in the individual evaporator phases (for example hydrocarbons), these impurities can be removed by passing the condensate through the absorption tanks 100 and/or 102 (which, for example, could be loaded with activated charcoal).

Because the effect of the absorption media is greater at low temperatures, it is appropriate to cool the condensate introduced into the absorption tanks 100 and/or 102. This can be accomplished, on the one hand, by means of the already mentioned coolers 63a, 63b, and 63c, or on the other hand, with the aid of the heat exchanger 104 which is fed by pump 106 and conduit 108 with relatively cold waste water from the tank 12. The waste water from conduit 108 which is heated in exchanger 104 can be returned via conduits 110 and 14 into the preheater 16. That way, not only is an improvement on the effectiveness of the absorption media achieved, but also the preheater 16 may then be of a smaller size or of a more compact design.

Thus, the description of the installation shows that it is possible, on the one hand, to (1) transfer energy to the heat consuming units with a heat carrier or heat transfer medium of a high enthalpy and (2) use the residual heat of the medium after it discharges from the heat consuming devices to additionally increase the subsequent waste water evaporation by pressure reduction so as to utilize it during the reduction for the purification of the waste water, while on the other hand, the installation can be adjusted to the fluctuating heat requirements of the heat consuming devices. At the same time purified condensate is yielded as warm, usable water. This usable water, which is composed of different condensate fractions from the collector conduit 62, has, in the above-described example system, an average temperature of about 70° to 80° C. (158° to 176° F.), if the condensate coolers 63a to 63c and/or the heat exchanger 104 are not used. This temperature is favorable for the execution of many reactions. If the condensate coolers 63a to 63c and the heat exchanger 104 are used, it is possible to increase the temperature of the usable water with the aid of the excess steam from conduit loop 35'. This excess steam also may be introduced directly into the regeneration water tank 94.

It can be seen moreover that the waste water is conducted in the circuit and only about 200 liters/hour which pass through the burner 92 need to be supplemented as fresh water out of the waste water quantity of approximately 50 m³/h.

What is claimed is:

1. A method for the transfer of heat in a system from a heat exchanger containing a fluid heating medium functioning as a heat source to at least one heat consuming unit operated at temperatures above 100° C. and using waste water as a heat transfer medium, said method comprising the steps of:

providing a high pressure section and low pressure section in said system and evaporating a portion of the waste water into steam in said high pressure section of said system by indirect heat exchange with said fluid medium;

separating the steam from the non-evaporated portion of the concentrated liquid waste water and the non-volatile impurities contained therein;

transferring heat by indirect heat exchange from the separated steam to the heat consuming unit;

condensing the steam into condensate suitable for industrial use diverting at least some of the pressurized steam for use in another part of the system when either or both of the following conditions occur: (1) the heat requirements of the heat consuming unit is reduced and (2) the waste water production is increased;

returning the condensate from said heat consuming unit to said low pressure section and transferring the residual heat of said returned condensate by indirect heat exchange to evaporate a further portion of the waste water into steam; and separating the steam evaporated from said further portion of the waste water from the remaining non-evaporated portion of the waste water.

2. The method in accordance with claim 1 wherein said low pressure section includes a first low pressure stage and wherein pressurized steam diverted away from the heat consuming unit and condensate from the steam obtained after the indirect heat exchange with the heat consuming unit are combined for use as a heat carrier for the subsequent evaporation of the unevaporated portion of the waste water under a lower pressure in the first low pressure stage.

3. The method in accordance with claim 2 wherein the ratio of the heat transferred by the diverted pressurized steam to the heat transferred by the condensate from the steam obtained after the indirect heat exchange with the heat consuming unit is between about 1:10 and about 10:1.

4. The method in accordance with claim 1 wherein the formation of pressurized steam from the initial evaporation of a portion of the waste water in the high pressure section takes place in one stage and the formation of steam from the remaining portion of the waste water takes place in the low pressure section in a plurality of stages.

5. The method in accordance with claim 4 further including a repeatable step of using the steam obtained during the subsequent evaporation at a lower pressure in the first low pressure stage for additional subsequent evaporation of the unevaporated part of the waste water in a subsequent low pressure stage.

6. The method in accordance with claim 5 wherein the pressure in at least one subsequent low pressure stage is maintained at a value where the corresponding temperature is not greater than about 100° C.

7. The method in accordance with claim 1 wherein the pressurized steam diverted away from the heat consuming unit and the condensate from the steam obtained during the indirect heat exchange with the heat consuming unit is used to heat the condensate and/or the waste water.

8. The method in accordance with claim 7 wherein the portion of the pressurized steam diverted from the heat consuming unit is introduced directly into the condensate.

9. The method in accordance with claim 1 wherein the volatile impurities contained in the condensate are removed with the aid of an absorption agent.

10. The method in accordance with claim 1 wherein the condensate is cooled by indirect heat exchange with the waste water.

11. The method in accordance with claim 10 wherein the condensate is conducted sequentially in countercurrent flow through coolers arranged after each evaporator phase.

12. The method in accordance with claim 1 wherein the steam is separated from the waste water and any existing waste water concentrate in cyclone type separators.

13. The method in accordance with claim 1 in which said heat source includes a burner, a circulation heater, a heat exchanger and a fluid heating medium and wherein said step of evaporating a portion of the waste water into steam under pressure includes first circulating said waste water through said heat exchanger and circulating said fluid heating medium through said heat exchanger to heat said waste water.

14. The method in accordance with claim 7 wherein the portion of the pressurized steam diverted from the heat consuming unit is used to transfer heat to the condensate by indirect heat exchange.

* * * * *